United States Patent
Berger et al.

(10) Patent No.: US 7,178,497 B2
(45) Date of Patent: Feb. 20, 2007

(54) INERTIAL TORQUE REACTION MANAGEMENT WITH SELECTIVELY ENGAGEABLE COUNTER ROTATING COMPONENT

(75) Inventors: Alvin Berger, Brownstown, MI (US); Vince Solferino, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/908,393

(22) Filed: May 10, 2005

(65) Prior Publication Data
US 2006/0254555 A1    Nov. 16, 2006

(51) Int. Cl.
F02B 75/00    (2006.01)

(52) U.S. Cl. .................. 123/192.1; 123/192.2
(58) Field of Classification Search ............. 123/192.1, 123/192.2
See application file for complete search history.

(56) References Cited

U.S. PATENT DOCUMENTS

| | | | |
|---|---|---|---|
| 4,977,508 A * | 12/1990 | Tanaka et al. ............... 701/111 |
| 5,033,425 A * | 7/1991 | Kadomukai et al. ..... 123/192.1 |
| 5,469,820 A | 11/1995 | Data et al. |
| 5,551,928 A | 9/1996 | Sudau |
| 5,570,615 A | 11/1996 | Westphal et al. |
| 5,657,728 A | 8/1997 | Diggs |
| 5,791,309 A | 8/1998 | Yamazaki et al. |
| 6,263,853 B1 | 7/2001 | Rau |
| 6,373,205 B1 * | 4/2002 | Weimer et al. ............. 318/114 |
| 6,382,163 B1 * | 5/2002 | Murray et al. ........... 123/192.1 |
| 6,442,455 B1 * | 8/2002 | Kotre et al. .................. 701/22 |
| 6,516,770 B1 | 2/2003 | Berger et al. |
| 6,655,340 B2 | 12/2003 | Garza |
| 6,715,376 B2 * | 4/2004 | Hojyo et al. .................. 74/414 |
| 6,732,694 B2 * | 5/2004 | Holweg ................. 123/179.25 |
| 6,799,553 B1 * | 10/2004 | Takenaka et al. ........... 123/321 |
| 6,868,815 B2 * | 3/2005 | Carden ..................... 123/192.2 |
| 7,013,859 B2 * | 3/2006 | Linnig ..................... 123/192.1 |

FOREIGN PATENT DOCUMENTS

| | | |
|---|---|---|
| EP | 0599125 B1 | 3/1997 |
| EP | 0499125 B1 | 4/1998 |
| JP | 7-35198 | 2/1995 |
| JP | 2002-357246 | 12/2002 |
| WO | WO 03/004845 A1 | 1/2003 |

* cited by examiner

*Primary Examiner*—Stephen K. Cronin
*Assistant Examiner*—Jason Benton
(74) *Attorney, Agent, or Firm*—Donald J. Lewis; Bir Law, PLC

(57) ABSTRACT

A system and method for managing inertial torque reaction of a powertrain include a selectively engageable counter-rotating component to reduce or eliminate torque reaction on stationary powertrain structure. Selectively engageable counter-rotating inertia may be provided by a simple inertial mass or by an electrical machine functioning as an integral starter/generator (ISG) to provide vehicle launch assist, regenerative braking of the vehicle, and engine cranking. Embodiments include gear-driven, chain-driven, and belt-driven counter-rotating inertias selectively coupled for counter-rotation relative to the crankshaft by a clutch, a belt-driven pulley assembly, or chain-driven intermediate shaft assembly with a hydraulically actuated coupling pin.

22 Claims, 6 Drawing Sheets

INERTIAL TORQUE REACTION MANAGEMENT WITH SELECTIVELY ENGAGEABLE COUNTER ROTATING COMPONENT

BACKGROUND OF THE INVENTION

1. Field of the Invention

The present invention relates to systems and methods for managing inertial torque reaction of rotating machines.

2. Background Art

A conventional powertrain has a "stationary" structure that is attached to the vehicle chassis with resilient mounts. In conventional powertrains, various engine and transmission components including the crankshaft, flywheel, and torque converter of an automatic transmission, for example, rotate in the same direction such that their rotating inertia has a compounding effect. When a compression or combustion event of the engine causes an acceleration of the rotating inertia, generally, there is an equal but opposite inertial torque reaction imposed upon the stationary structure. As such, the stationary structure is not truly stationary, but instead, vibrates in opposition to the accelerations of the rotating inertia. This vibration of the stationary structure passes vibration through the resilient mounts into the vehicle chassis, and may result in unwanted noise and vibration within the vehicle passenger compartment.

Conventional solutions to this vibration issue include controlling the engine operating conditions to minimize the magnitude and frequency range of the inertial torsional vibrations and tuning the powertrain mounts to minimize transmission of vibrations. However, the constraints placed on the engine/powertrain operation may impact the ability to achieve other desirable operating characteristics relative to responsiveness, fuel economy, and/or emissions, for example. Some known solutions control one or more counter-rotating elements to reduce or eliminate inertial torque reaction, such as disclosed in U.S. Pat. Nos. 5,551,928, and 5,570,615, for example. While these approaches may reduce the torque reaction on the powertrain structure, the increased mass also increases weight and reduces responsiveness of the system and may have an associated adverse impact on fuel economy.

Other solutions use an Integrated Starter Generator (ISG) as the counter rotating inertia as disclosed in U.S. Pat. No. 5,606,946; WO 03004845; and U.S. Pat. No. 6,516,770, for example. However, the present inventors have recognized that the benefits of counter rotating inertia as well as the fuel economy and performance benefits of an ISG diminish at higher engine rotational speeds.

SUMMARY OF THE INVENTION

The present invention includes a system and method for managing inertial torque reaction that include a selectively engageable counter rotating component to reduce or eliminate torque reaction on stationary powertrain components.

In one embodiment, the present invention uses a selectively engageable counter-rotating inertia installed within the engine sump to reduce or eliminate the inertial torque reaction otherwise associated with angular acceleration/deceleration of a rotating mass on stationary structure or mounting components. The counter rotating inertia may be provided by a simple inertial mass or by an electrical, hydraulic, or pneumatic machine functioning as an integral starter/generator (ISG). The system and method include a device to mechanically and/or electrically couple the counter-rotating inertia to one or more forward rotating components. The device may be implemented by a plurality of drive components such as gears, belts, chains and sprockets, or any similar device used to couple to a torque-carrying component of an internal combustion engine such as the crankshaft. A scissors type gear or other feature to reduce or eliminate backlash to closely couple the counter-rotating component(s) and prevent gear rattle may also be used.

Various embodiments of the invention use sliding type bearings, springs, and flanges, or a plurality of locking devices such as a hydraulically actuated pin that can engage and disengage to selectively couple and uncouple the counter-rotating inertia when desired. Appropriate selection of the drive ratio(s) across the coupling device to drive the counter-rotating inertia faster than the forward rotating inertia allows the counter-rotating inertia to be smaller in size and mass, yet still substantially match the effective inertia of the forward rotating components.

In one embodiment of the present invention, the coupling device includes a plurality of pulleys and belts to drive the counter-rotating inertia, which may be implemented by a machine capable of coupling a load to provide regenerative braking, as well as being operated as a motor to provide vehicle launch assist and engine cranking, for example. In this embodiment, the drive belt wraps around a pulley connected to the counter-rotating inertia and transfers torque to and from a large diameter forward rotating pulley by friction generated at the clamping points between the forward rotating pulley and the counter-rotating pulleys within the belt loop. To disengage the counter-rotating members from the forward rotating pulley, a transport structure that carries the counter-rotating pulleys is moved away from the forward rotating pulley.

The present invention provides a number of advantages. For example, the present invention provides systems and methods for managing inertial torque reaction using a selectively engageable counter-rotating inertia to reduce or eliminate the torque reaction on the powertrain structure and improve performance with respect to noise, vibration, and harshness (NVH). Selectively disengaging the counter-rotating inertia at higher engine rotational speeds reduces any adverse impact on system performance and response, reduces any associated friction and wear of the coupling device and counter-rotating inertia, and facilitates use of a positive speed differential to increase speed of the counter-rotating inertia relative to the crankshaft so that effective inertia can be substantially matched with smaller and less massive components. Rotating an integral starter/generator in a direction opposite to that of the engine crankshaft obviates the need for additional non-functional components or mass to generate balancing inertia. This reduces any adverse impact on powertrain weight, responsiveness, and overall performance and fuel economy relative to conventional solutions that add components solely for balancing or canceling torque reactions associated with rotating inertia. Additionally, an integral starter/generator provided according to the teachings of the present invention may be used to provide vehicle launch assist, engine cranking (eliminating the conventional starter motor), and regenerative braking without increasing powertrain length associated with a conventionally mounted ISG. The present invention may allow variable displacement engines to idle and drive at low engine speeds with fewer than all of the cylinders firing without unacceptable NVH. Also, the reduced or limited inertial torque reaction on the stationary powertrain structure should reduce noise, vibration, and harshness (NVH) with the uneven firing intervals that occur when an 8-cylinder engine operates in a reduced or variable displacement mode with 3, 5, 6, or 7 firing cylinders, for example.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
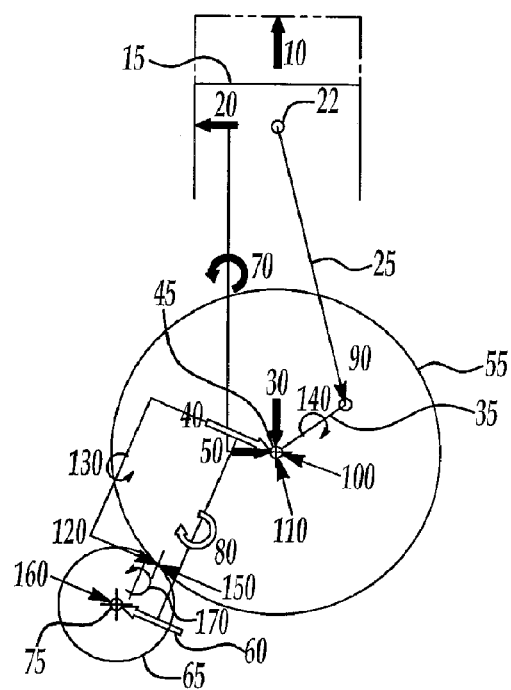
FIG. 1 is a free-body diagram illustrating operation of a system or method having a counter-rotating inertia for canceling moments on a flywheel according to one embodiment of the present invention.

Referring now to FIG. 1, a free-body diagram is shown illustrating operation of the present invention with a counter-rotating inertia, as may be provided by an integral starter/generator (ISG), for example, to cancel moments on a flywheel associated with angular acceleration of the inertia to reduce or eliminate reaction torque on stationary powertrain structure. As those of ordinary skill in the art will appreciate, the present invention is applicable to a variety of reciprocating internal combustion engines/motors that may include spark-ignition and compression-ignition engines and other prime movers particularly suited for vehicular applications. The present invention may be utilized in various other types of engines and other prime movers that generate a vibrational reaction torque or moment associated with rotational acceleration or deceleration of various engine, motor, and/or transmission/powertrain components and is not limited to vehicular applications or internal combustion engines. For a typical internal combustion engine application, a crankshaft represented generally by reference numeral 35 is a primary constituent of engine rotational inertia and the resulting reaction torque. Other components whose angular acceleration may contribute to the reaction torque include a flywheel 55, connecting rod 25, harmonic damper and camshaft(s) (not shown), for example. A counter-rotating inertia 65, which may be provided by an integral starter/generator (ISG) may be coupled or connected to flywheel 55 as described in greater detail herein.

In FIG. 1, vector forces and moments acting on moving components of the engine are illustrated by narrower arrows, such as arrows 100 and 130 whereas vector forces and moments acting on "stationary" structure of the engine are illustrated by wider arrows such as arrows 30, 40, and 70 with reactions to the powertrain structure due to accelerations of the normal forward rotating components represented by solid wide arrows such as 30 and 70 and reactions due to the counter rotating inertia represented by hollow wide arrows, such as 40 and 80.

In operation, gas pressure within the cylinder pushes upward against the cylinder head, and downward against the top of the piston as represented by force 10. To simplify the analysis, piston 15 and connecting rod 25 are assumed to have negligible inertia so all of the downward force on piston 15 transfers along the axis of connecting rod 25 to crankshaft 35. At the particular crank angle illustrated, connecting rod 25 forms an angle relative to the cylinder bore, resulting in a side force 20 created at piston 15 against the wall of the cylinder bore (the three forces acting at piston pin 22 mutually cancel one another). The force 90 transmitted from connecting rod 25 to the crankpin journal of crankshaft 35 is matched by an equal magnitude, but opposite direction force 110 from the cylinder block main bearings, acting on the crankshaft main bearing journals. Because these equal but opposite forces 90, 110 from connecting rod 25 and the main bearings are offset from each other by an effective lever arm, they form a couple with an associated moment 140 that exerts an angular acceleration on the flywheel/crankshaft assembly. The force 110 that the main bearings exert on crankshaft 35 is matched by an equal but opposite force from crankshaft 35 to the cylinder block. If this force from the crankshaft main bearing journals to the cylinder block is resolved into vertical and horizontal components 30, 50, respectively, vertical component 30 matches in magnitude and alignment to upward force 10 of the gas pressure on the cylinder head, so that they mutually cancel each other. Horizontal component 50 of the force of the main bearing journals on the cylinder block opposes horizontal force 20 of piston 15 against the cylinder bore in both direction and magnitude, but is offset by the vertical distance between the main bearing journal and piston pin 22. This vertical offset of the two opposing forces exerts a moment 70 on the cylinder block structure. The moments 140, 70 acting on the crankshaft/flywheel assembly and on the cylinder block structure, respectively, are equal in magnitude, but opposite in hand, so that there is no net unbalanced moment or reaction torque on the overall engine assembly. The cylinder block structure and other attached "stationary" powertrain components have a substantially greater moment of inertia than the flywheel/crankshaft assembly, so the angular acceleration of the cylinder block structure transmitted through the powertrain mounts is significantly less than that of the crankshaft/flywheel assembly. However, some modes of powertrain operation create more torsional vibration of the cylinder block than the mounts can effectively isolate so that it is desirable to reduce or cancel some of the inertial moment acting on the engine structure according to various embodiments of the present invention.

As also illustrated in FIG. 1, a counter-rotating inertia 65 according to the present invention generates a moment 80 acting on the engine structure that opposes moment 70 generated by reaction to acceleration of forward rotating flywheel 55. The counter-rotating inertia is selectively engageable as illustrated and described herein and may be implemented by a simple counter-rotating inertial component or by an electric, hydraulic, or pneumatic machine, which may provide auxiliary benefits of replacing the starter motor and/or capturing braking energy that can be returned to the vehicle as launch assist. Although the representative embodiment illustrated in FIG. 1 includes a gear driven counter-rotating inertia, other drive mechanisms may also be used.

At the gear tooth interface between flywheel 55 and counter-rotating inertia 65 (implemented by an ISG in this example), flywheel 55 exerts a force 150 on the ISG rotor, and the ISG bearings (attached to the cylinder block structure) exert an opposing force 160 on the ISG rotor. These equal but opposite forces 150, 160 with an offset generate a moment 170 on the ISG rotor. At the gear tooth interface, the ISG rotor exerts a force 120 on flywheel 55, opposed by an equal but opposite force 100 at the crankshaft main bearing journals. This couple has an associated moment 130 of opposite hand relative to moment 140 generated by connecting rod force 90 on crankshaft 35, so the angular acceleration of flywheel 55 is offset or reduced. Force 100 acting on the main bearing journals is matched by an opposing force 40 exerted by the main bearing journals onto the cylinder block's main bearings. Likewise, force 160 from the ISG bearings to its rotor is matched by force 60 from the rotor to the bearings. Force 40 at the crankshaft main bearings and force 60 at the ISG bearings are equal in magnitude but opposite in direction and offset from each other to produce a moment 80 on the cylinder block structure. If the ISG drive ratio and inertia are selected appropriately, clockwise moment 80 will cancel CCW moment 70, and CCW moments 130 and 170 will sum to cancel the CW moment 140. As such, there is no unbalanced inertial moment imposed upon the cylinder block, and the net vibrational torque reaction transmitted to the engine mounts or other stationary powertrain components, such as a vehicle chassis, is reduced or eliminated. The effective magnitudes of the rotational inertias generated by engine components and components associated with the counter-rotating integral starter/generator (ISG) may be adjusted via selection of component mass and geometry, selective engagement of components having different mass and/or geometries, and/or by the relative rotational speed between forward rotating and counter-rotating components, which may be selected or determined by the selectively engageable coupling device or mechanism. Alternatively, or in combination, selective coupling of a variable load to the ISG can generate a torque between rotating and stationary components of the engine to reduce or cancel the torsional excitation generated by the firing impulses. This reduction of torsional excitation will reduce the torsional vibration of the powertrain output shaft(s) and reaction of the powertrain structure to that vibration.

Figure 2:
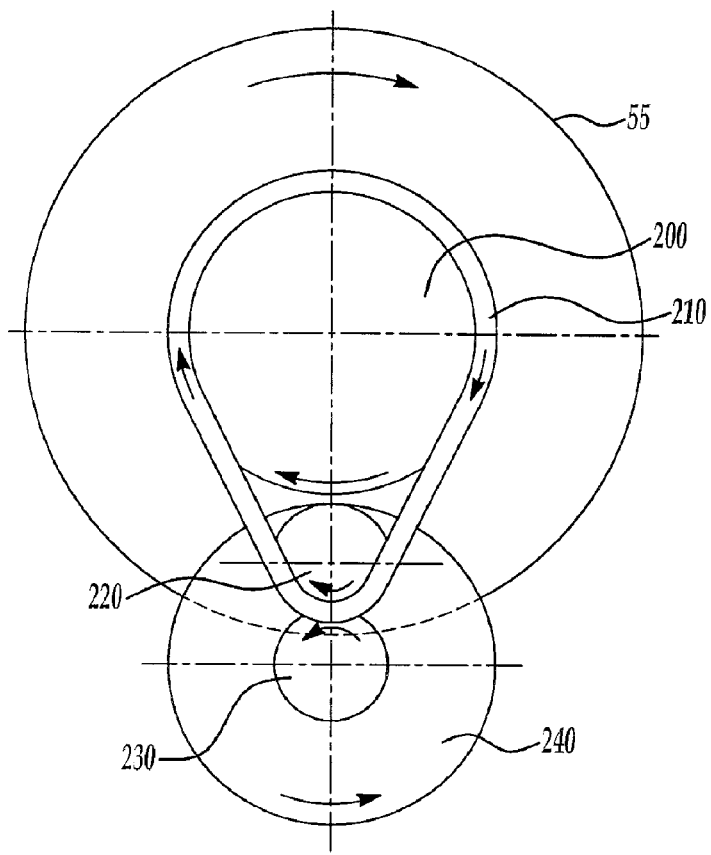
FIG. 2 is an end view block diagram illustrating operation of one embodiment for a system or method for managing inertial torque reaction according to the present invention.

An end view block diagram illustrating one embodiment of a system or method for managing inertial torque reaction using a selectively engageable counter-rotating inertia is shown in FIG. 2. Chain drive 210 transfers torque from a crankshaft sprocket 200 mounted for rotation with a crankshaft 262 (FIG. 3) to an intermediate shaft with an associated sprocket/gear cluster 220 that rotates in the same direction as flywheel 55. A secondary gear of sprocket/gear cluster 220 meshes with a corresponding gear 230, which may be a scissors gear to reduce or eliminate any gear lash, to provide counter-rotation of inertia 240, which is illustrated as a simple inertial component in this embodiment. The interface between intermediate sprocket/gear cluster 220 and counter-rotating gear 230 is such that counter-rotating gear 230 rotates in a direction opposite to that of intermediate sprocket/gear cluster 220. Counter-rotating gear 230 is connected to inertial component 240 to provide the counter-rotating inertia according to the present invention.

Figure 3:
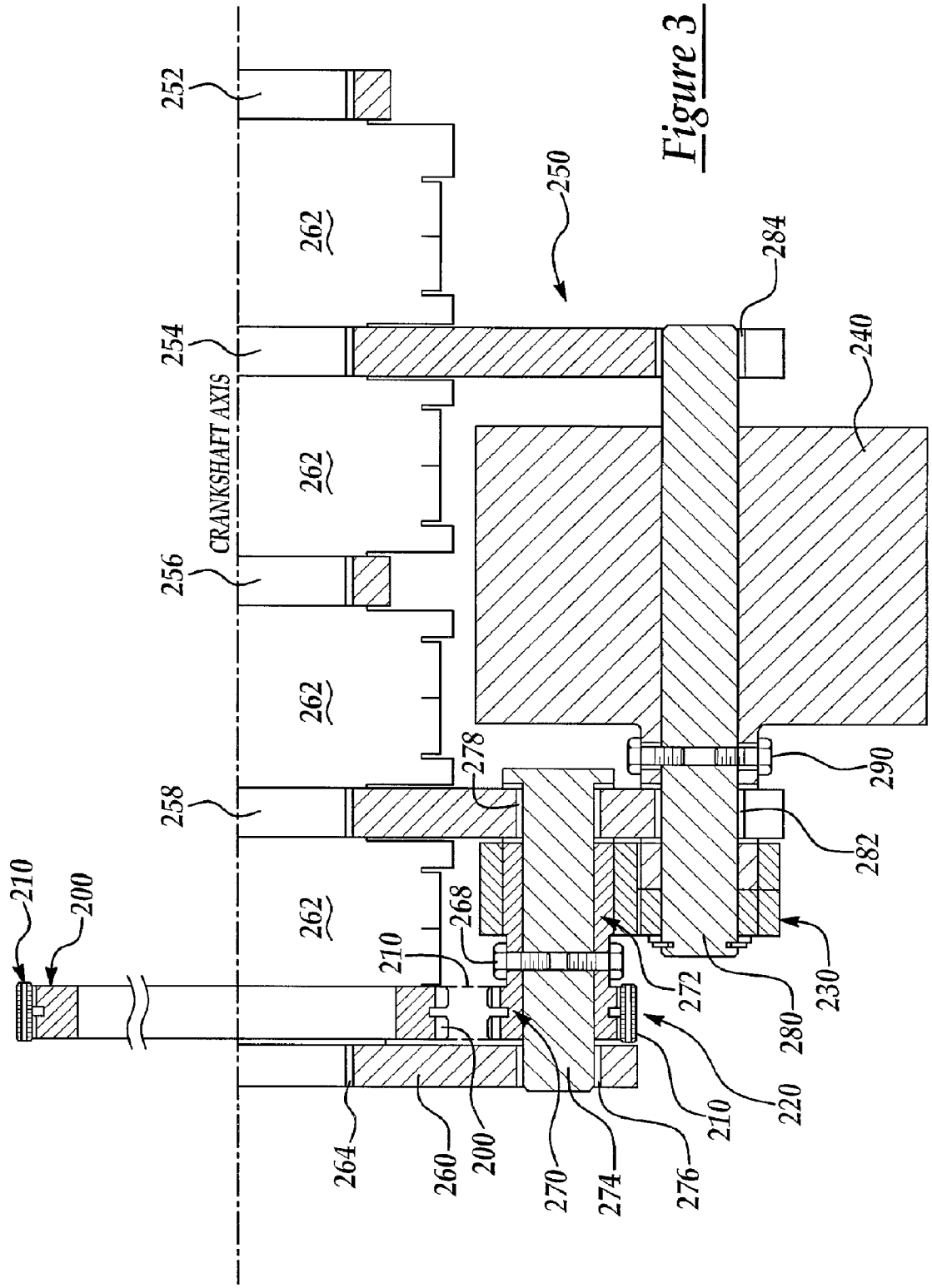
FIG. 3 is a partial cross-sectional view of the embodiment illustrated in FIG. 2.

FIG. 3 is a partial cross-sectional view of an eight-cylinder internal combustion engine implementation for the embodiment of the invention illustrated in FIG. 2. The partial cross-section illustrates the bottom half of a crankshaft 262 to illustrate representative positioning of a selectively engageable counter-rotating inertial component in an engine sump. Engine cylinder block 250 includes a number of bulkheads 252, 254, 256, 258, and 260 that are used to support various rotating components, such as crankshaft 262 using conventional bearings 264. For example, crankshaft 262 includes a number of concentric journals that extend through the various bulkheads and are supported by associated main bearings 264 disposed within through bores in at least bulkheads 252 and 260. To provide counter-rotation of inertial component 240 relative to crankshaft 262, intermediate sprocket/gear cluster 220 includes an intermediate sprocket portion 270 and gear portion 272 secured for rotation by threaded pin or fastener 268 to an intermediate shaft 274. Bearings 276, 278 in bulkheads 260, 258, respectively, allow intermediate shaft 274 to rotate when driven by chain 210 which engages sprocket portion 270 and rotates in the same direction as sprocket 200, which is selectively engaged or coupled for rotation with crankshaft 262 as illustrated and described with reference to FIG. 4. Alternatively, sprocket portion 270 and gear portion 272 of intermediate cluster 220 may be implemented by separate components with either one or both selectively coupled to intermediate shaft 274 to provide selective engagement of counter-rotating inertia 240.

As also shown in FIG. 3, gear portion 272 of intermediate cluster 220 is in meshing engagement with a counter rotating gear 230, implemented by a two-part scissors gear in this embodiment to reduce or eliminate backlash so that inertial component 240 is closely coupled to forward rotating inertial components such as crankshaft 262 and to reduce or eliminate any noise. Scissors gear 230 is secured to counter-rotating shaft 280, which is supported for rotation by bearings 282 and 284 secured to bulkheads 258 and 254, respectively. A threaded fastener or pin 290 secures inertial component or device 240 for rotation with counter-rotating shaft 280.

Appropriate selection of the size and number of teeth for gear portion 272 and meshing gear 230, in addition to sprockets 200 and 270 may be used to provide a speed differential to substantially match the effective forward rotating and counter-rotating inertias. For example, appropriate selection of the driving and driven sprockets and meshing intermediate gear may increase the rotational speed of inertial component 240 relative to crankshaft 262 to reduce the mass of counter-rotating inertial component or device 240 while substantially matching effective inertia of various forward rotating components.

Figure 4:
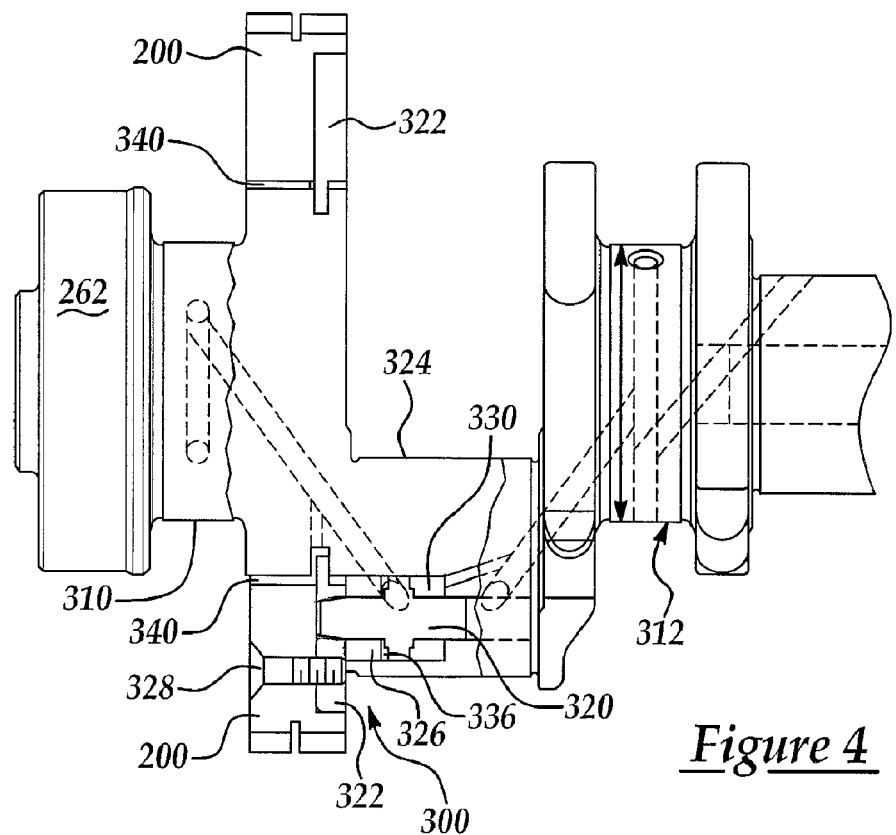
FIG. 4 is a partial cross-sectional view of one embodiment of a device for selectively coupling and uncoupling a counter-rotating inertia as shown in FIGS. 2 and 3.

During operation, drive sprocket 200 is selectively coupled to crankshaft 262 by a coupling mechanism (as shown in FIG. 4, for example) for rotation with crankshaft 262 to drive sprocket portion 270 of intermediate cluster 220 via chain 210 in the same direction, but at a higher rotational speed. Sprocket portion 270 is secured to intermediate shaft 274 and gear portion 272, which drives scissors gear 230 and counter-rotating shaft 280 in the opposite direction to provide counter-rotation of inertial component or device 240. Counter-rotating inertial component or device 240 may be selectively disengaged or uncoupled from crankshaft 262 based on current engine operating conditions or parameters, such as engine speed or the number of firing cylinders in a variable displacement engine (VDE) application, for example.

In FIG. 4, a partial cross-sectional view of one embodiment of a device for selectively coupling and uncoupling a counter-rotating inertia according to the present invention is shown. In this embodiment, device 300 selectively couples and uncouples sprocket 200 to crankshaft 262 to selectively provide a counter-rotating inertia as described above with reference to FIGS. 2 and 3. Crankshaft 262 includes journals 310, 312 that are supported for rotation by corresponding main bearings in respective bulkheads 260 and 258 (FIG. 3) of the engine cylinder block when assembled. Device 300 includes a hydraulically actuated pin 320 that slides within a corresponding bore in crank pin 324 and bushing 326 to engage and disengage a two-piece thrust flange 322 secured to sprocket 200 via fasteners 328. Coupling pin 320 is illustrated in the engaged/coupled position so that sprocket 200 is coupled via pin 320 for rotation with crankshaft 262 based on a control signal to provide hydraulic pressure using engine lubricating oil supplied to chamber 330 from journal 312. As illustrated and described in greater detail with reference to FIG. 5, high pressure lubricating oil fills chamber 330 and moves coupling pin 320 against the force of a compression spring 336 and hydraulic oil pressure from journal 310 toward the illustrated engaged position. Those of ordinary skill in the art will recognize that a differential force may be created with equal hydraulic pressure on both sides of coupling pin 320 to bias or move pin 320 toward either the engaged or disengaged position based on the differential area associated with the pin lands or flats. Pin 320 may include a tapered end cooperating with a corresponding bore in thrust flange 322 to facilitate engagement under selected engine operating conditions or parameters.

To disengage sprocket 200 from crankshaft 262, a control signal is provided to lower hydraulic pressure supplied to journal 312 and/or to increase hydraulic pressure to journal 310 so that the force of compression spring 336 in combination with differential oil pressure supplied to the opposite sides of coupling pin 320 moves pin 320 out of engagement with thrust flange 322. Compression spring 336 maintains coupling pin 320 in the disengaged position even if the differential hydraulic pressure is lowered or removed completely. In the disengaged position, bushing 340 allows crankshaft 262 to rotate while sprocket 200 remains stationary such that the driving torque for the counter-rotating inertia is removed. Depending upon the particular application, the counter-rotating inertial component may include an integral or auxiliary brake to slow and stop rotation of the component upon disengagement if desired. If implemented by an electrical, hydraulic, or pneumatic machine, regenerative braking may be used to slow or stop the counter-rotating inertial components upon disengagement from the driving member, as well as to capture kinetic energy of the vehicle during regenerative vehicle braking prior to disengagement of the machine from the crankshaft.

For proper coupling/engagement of the counter-rotating inertia in this embodiment, rotational speed of crankshaft 262 and sprocket 200 should be substantially synchronized. For applications using a hydraulic or pneumatic machine, or an electrical machine functioning as an integral starter/generator, the machine can be operated as a motor to accelerate the counter-rotating inertia to a substantially synchronous speed with the crankshaft before controlling coupling pin 320 to couple the counter-rotating inertia to crankshaft 262.

Figure 5:
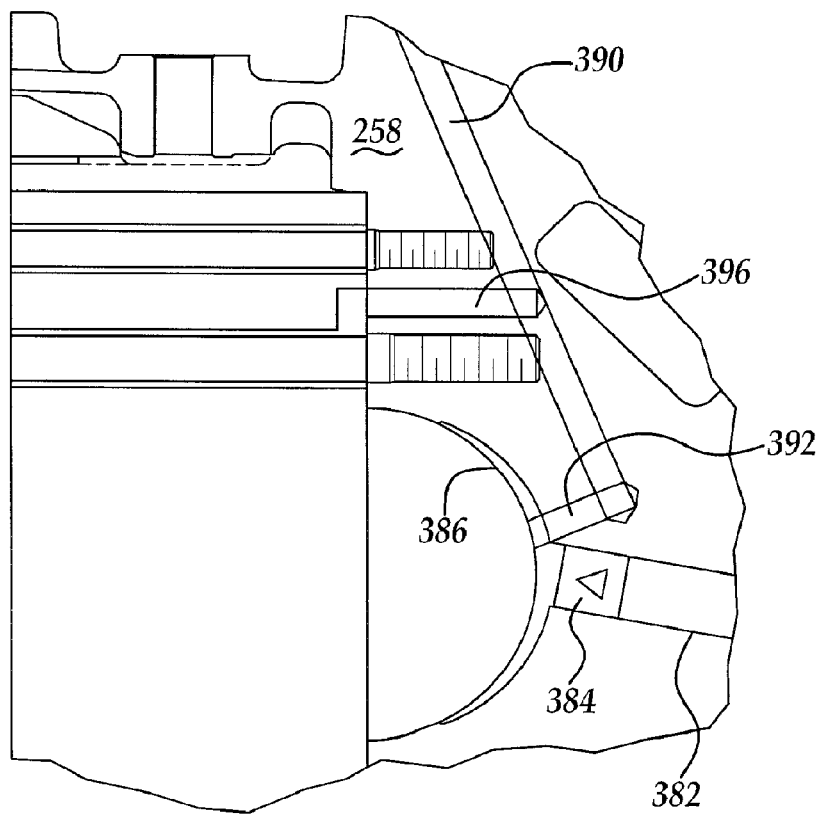
FIG. 5 is a cross-sectional view showing a representative oil pressure supply for the mechanism illustrated in FIG. 4.

FIG. 5 is a partial cross-section of a representative bulkhead of an engine cylinder block with an oil pressure supply system for actuating a device to selectively couple a counter-rotating inertial component according to one embodiment of the present invention. The various features of the representative bulkhead illustrated apply equally to bulkheads 258 and 260 (FIG. 3) such that both bulkheads include similar or identical features as described below with respect to bulkhead 258, unless otherwise noted. Likewise, similar features may be provided in bulkhead 254 (FIG. 3) to provide lubrication for counter-rotating shaft 280 (FIG. 3), for example, without the features that supply high pressure oil for actuation of a coupling device.

Lubrication is provided to an associated main bearing installed in bore 386 from the main engine gallery through passage 382 in bulkhead 258. A one-way check valve 384 allows main bearing bore 386 and an associated main bearing to receive oil at normal pressure from the main gallery but prevents oil from returning back to the main gallery through passage 382. An external oil supply (not shown) selectively supplies lubricating oil at an elevated or high pressure through passages 390 and 392 to control actuation of coupling pin 320 (FIG. 4). Depending upon the particular application and implementation, elevated oil pressure may be provided by an electrically driven pump (not shown) that takes oil from elsewhere in the lubrication system and uses a diverting valve to pass the oil at elevated pressure to bulkheads 258, 260 (FIG. 3). A reversible pump could alternatively be used to transfer oil at elevated pressure between bulkhead 258 and bulkhead 260 to actuate the coupling device.

Check valve 384 shown in FIG. 5 maintains the elevated oil pressure around the bearing installed in bore 386 by preventing the return flow to the main gallery. Elevated pressure lubricating oil then passes from the bearing, through journal 312, to chamber 330, to act on coupling pin 320 as shown in FIG. 4. Similar passageways in bulkhead 260 supply high pressure lubricating oil to disengage coupling pin 320 (FIG. 4) when desired based on engine or ambient operating conditions or parameters. Bulkheads 254, 258, 260 also include lubricating passages 396 for lubrication of bearings 276, 278 of intermediate shaft 274 (FIG. 3) and bearings 282, 284 of counter rotating shaft 280 (FIG. 3).

Figure 6:
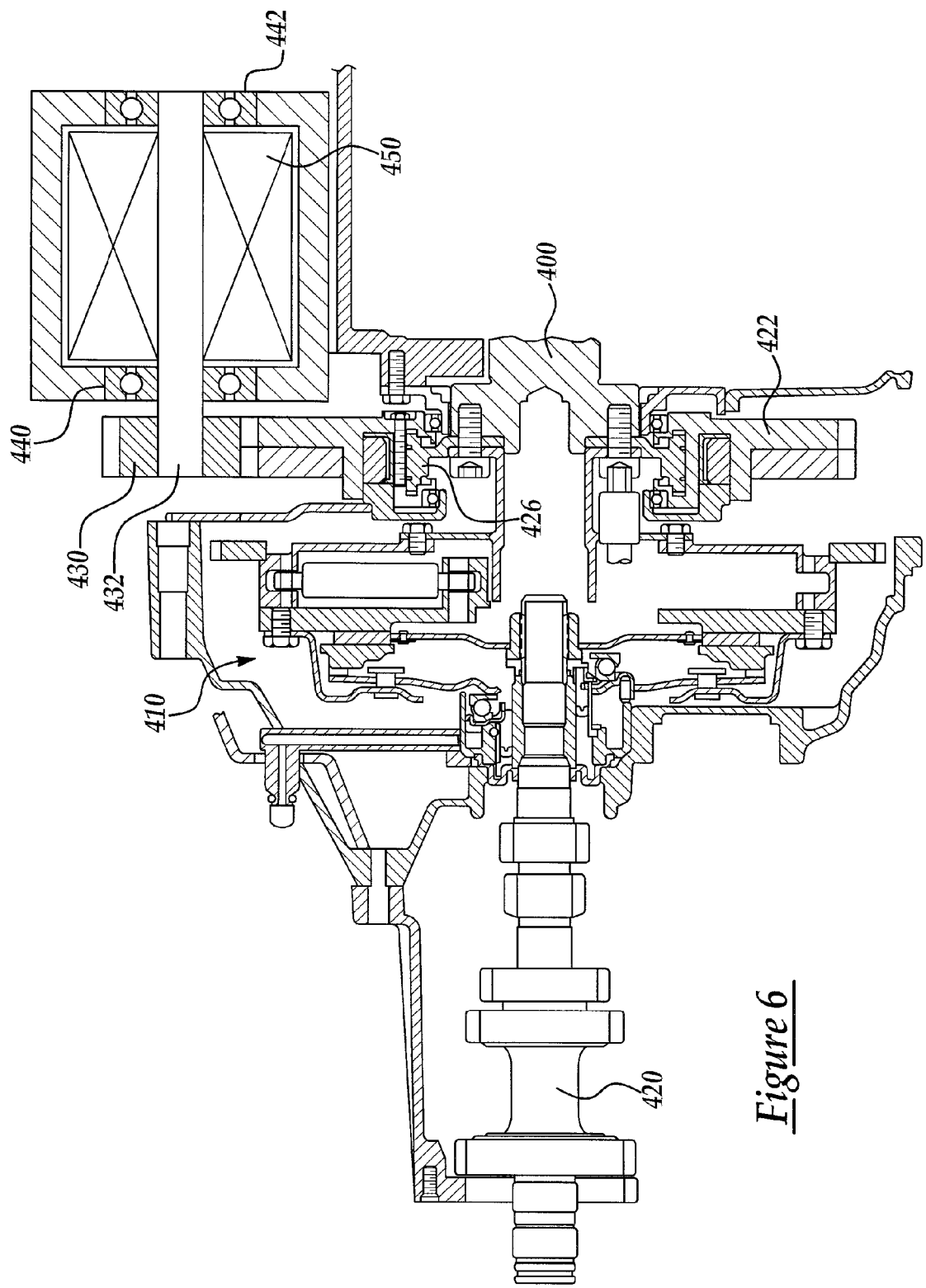
FIG. 6 is a cross-section of one embodiment for a system or method for managing inertial torque reaction with a selectively engageable gear-driven counter-rotating inertia.

FIG. 6 is a cross-section of another embodiment for a system or method of managing inertial torque reaction according to the present invention. In the embodiment of FIG. 6, crankshaft 400 rotates in a forward direction and has an associated rotational inertia. Crankshaft 400 is coupled through clutch mechanism 410 to drive shaft 420, which rotates in the same direction as crankshaft 400. A scissors gear 422 is selectively engageable for rotation with crankshaft 400 using a coupling device implemented by an electromagnetic clutch 426. As previously described, a scissors gear or similar device is used to eliminate backlash and associated noise, as well as to tightly couple the counter-rotating inertia 450 to crankshaft 400 via gear 430 and scissors gear 422. Otherwise, small angular accelerations of crankshaft 450 could be lost in the gear lash and not translated to corresponding angular accelerations in the opposite direction of the counter-rotating inertia to reduce or eliminate the associated reaction torque.

As illustrated in FIG. 6, scissors gear 422 is in constant meshing engagement with gear 430, which is secured for rotation with shaft 432. As such, the gear interface between scissors gear 422 and gear 430 operates to reverse rotational direction of shaft 432 relative to crankshaft 400. In addition, the relative sizes and number of teeth of scissors gear 422 and gear 430 are selected to provide a positive or increased speed differential so that shaft 432 and associated inertial components rotate faster than crankshaft 400 so that the effective inertia of shaft 432 and associated inertial components can substantially match the effective inertia of crankshaft 400 and other forward rotating components using inertial components of smaller mass. Counter-rotating inertial component 450 is secured for rotation with shaft 432, which is supported by bearings 440 and 442. Counter-rotating inertial component 450 may be implemented by a simple inertia or by an electrical, hydraulic, or pneumatic machine. If implemented by a simple inertia, clutch 426 or an alternative coupling device should be appropriately sized to accelerate counter-rotating inertial component 450 during selective engagement to crankshaft 400 when crankshaft 400 is rotating. Use of a machine provides the benefits of a counter-rotating inertia to manage reaction torque in addition to the ability of providing regenerative braking (functioning as a generator or a hydraulic or pneumatic accumulator or other energy storage device), engine cranking, and/or vehicle launch assist (functioning as a motor).

Depending upon the particular application, clutch 426 may be implemented by any of a variety of wet or dry mechanical/hydraulic clutches, an electromagnetic clutch, or similar device. Clutch 426 is controlled in response to engine or ambient operating conditions or parameters to selectively couple and uncouple counter-rotating inertial component 450. For example, depending upon the particular application, clutch 426 may be engaged only during selected engine operating modes, such as during idle, when operating in a variable displacement mode, and/or when operating below a selected engine speed (such as 1500 RPM). Generally, it is desired to engage counter-rotating inertial component 450 when the operating mode or conditions would otherwise generate a vibrational reaction torque on the stationary components and to disengage component 450 when the engine operating mode or conditions have reduced reaction torque, or when other considerations (such as a demand for increased acceleration) outweigh the desired to reduce or eliminate the associated reaction torque.

Figure 7:
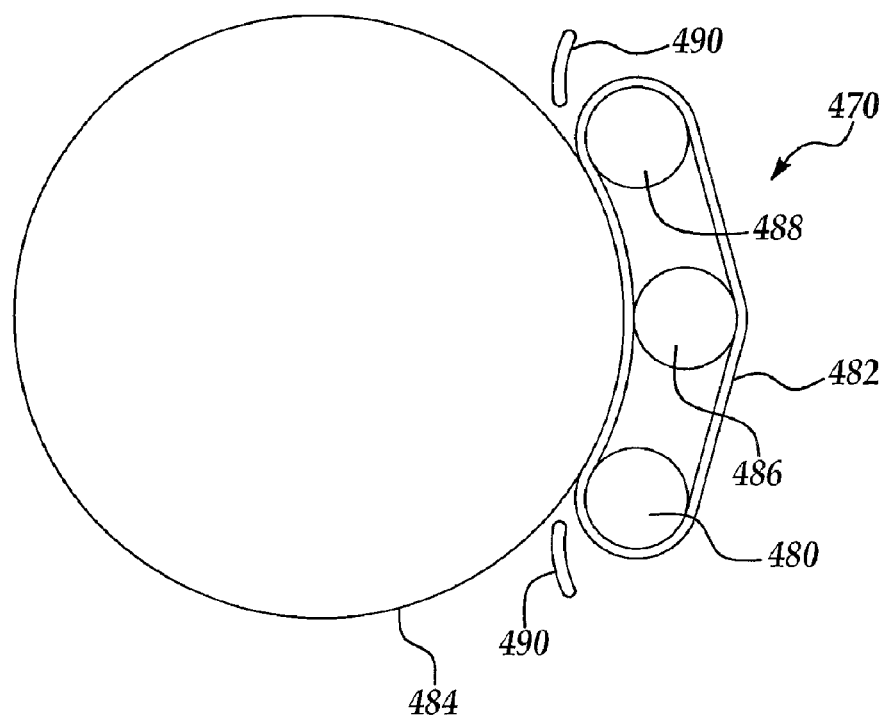
FIG. 7 is an end view block diagram of one embodiment for a system or method for managing inertial torque reaction with a selectively engageable belt-driven counter-rotating inertia.
Figure 8:
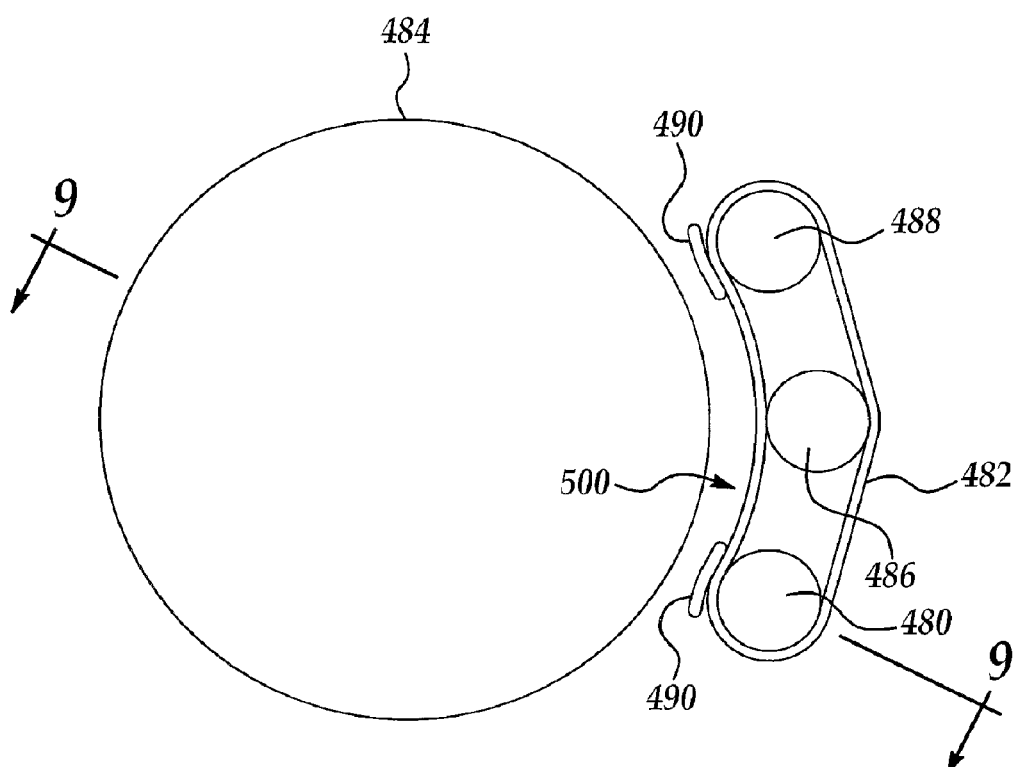
FIG. 8 is an end view block diagram of the embodiment illustrated in FIG. 7 in a disengaged position to uncouple the counter-rotating inertia.

FIGS. 7 and 8 are block diagrams illustrating another embodiment of a system or method for managing inertial torque reaction according to the present invention. In the embodiment illustrated in FIGS. 7 and 8, the counter-rotating inertia coupling device 470 is implemented by a belt and pulley system to selectively engage (FIG. 7) and disengage (FIG. 8) a counter-rotating inertia under selected conditions. Drive pulley 480 is mounted on the shaft of an inertial component or machine (not shown) that may be used to provide regenerative braking as well as engine cranking and launch assist as previously described. Drive belt 482 wraps around drive pulley 480 and transfers torque to and from a large diameter pulley 484 located outside the outer diameter of the flywheel or torque converter, by friction generated by the belt 482 at the clamping points between large diameter pulley 484 and counter-rotating inertia drive pulley 480 as well as idler pulleys 486, 488 within the belt loop. The exact number of idler pulleys required to transmit the counter rotating torque can vary from one engine design to another. As such, in the engaged position illustrated in FIG. 7, coupling device 470 provides counter-rotation of drive pulley 480 and any associated inertial components to reduce or eliminate any reaction torque associated with changes in acceleration of forward rotating inertial components, such as the flywheel and pulley 484. The size of drive pulley 480 is selected relative to the size of large diameter pulley 484 to provide a speed differential so that effective inertia of forward rotating and counter-rotating components may be substantially matched using counter-rotating components of smaller mass. Stated differently, a higher drive ratio (and resulting speed differential) provides the benefit of allowing the counter-rotating inertia to be smaller and lighter. Driving the counter-rotating inertia from a large diameter, such as the outside diameter of pulley 484, provides a high drive ratio in a single-stage drive.

As illustrated in FIG. 8, when it is desired to disengage the counter-rotating members from pulley 484, a transport structure 530 (FIG. 9) that carries drive pulley 480 and counter-rotating idler pulleys 486, 488 is moved away from large diameter pulley 484.

Belt control clamps 490 are then positioned to secure drive belt 482 against drive pulley 480 and idler pulley 488 and place a small compressive load on drive belt 482 on the flywheel side 500 of mechanism 470 to keep drive belt 482 from dragging against rotating pulley 484. To subsequently engage the counter-rotating inertial component(s), drive belt control clamps 490 are moved outward and the transport mechanism moves toward pulley 484 to the engaged position as illustrated in FIG. 7. If the counter-rotating inertia is provided by a machine, the machine may be operated as a motor so that the speed of inertia drive pulley 480 approaches the speed of large diameter pulley 484 prior to engagement of the transport mechanism.

As with the previously described embodiments, the embodiment illustrated in FIGS. 7 and 8 selectively supplies an effective counter-rotating inertia that substantially offsets the effective forward rotating inertia to reduce or eliminate reaction torque on stationary powertrain structure. The ability to reduce or remove the counter-rotating inertia based on engine operating modes, conditions, and/or parameters provides a number of benefits relative to system acceleration performance, reduced design requirements and wear on counter-rotating components and coupling devices, and the ability to use inertial components of smaller size and mass.

Figure 9:
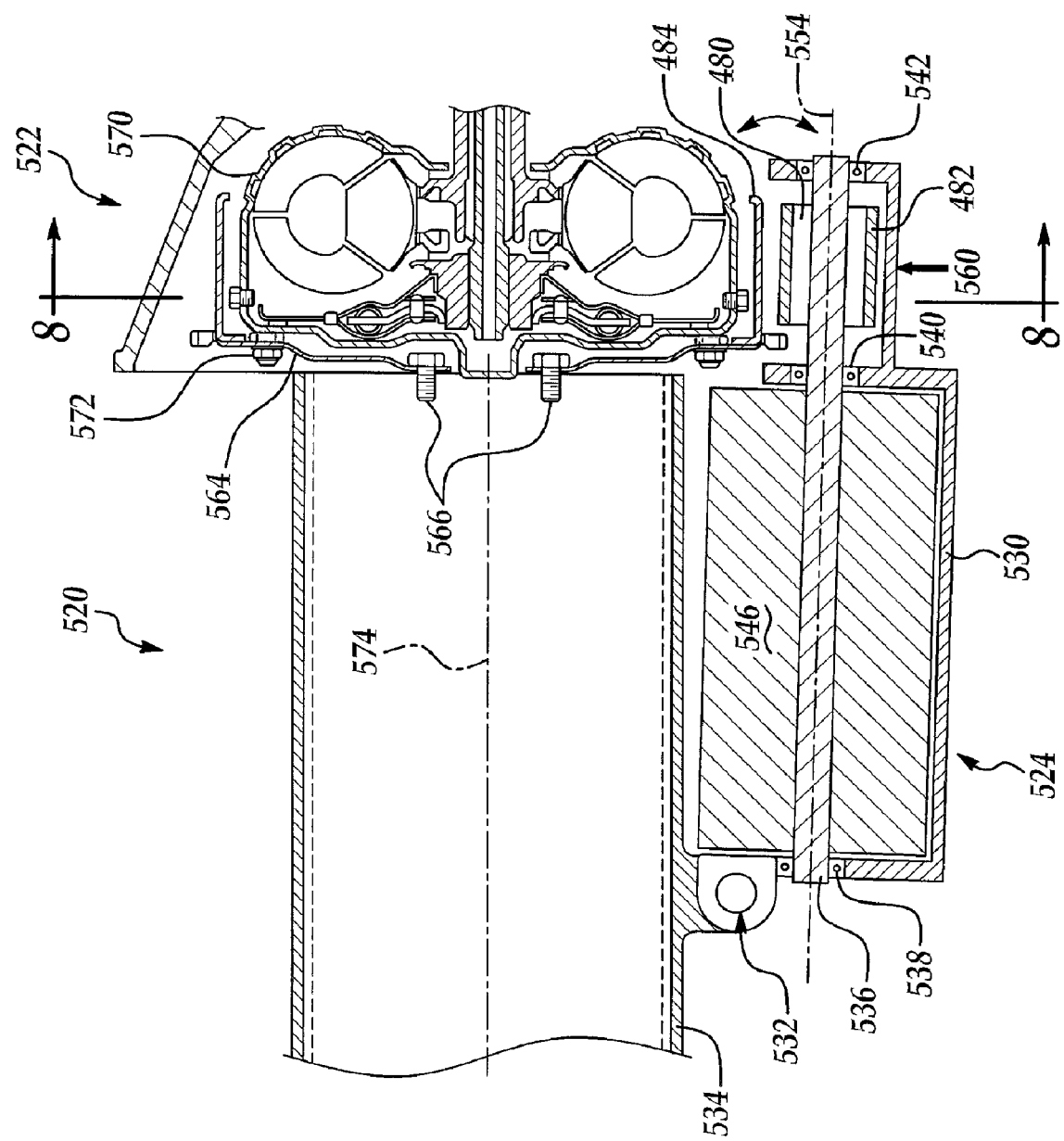
FIG. 9 is a cross sectional view of the embodiment illustrated in FIGS. 7 and 8 for managing inertial torque reaction using a selectively engageable belt-driven counter-rotating inertia that pivots between engaged and disengaged positions.

Another view of the system shown in FIGS. 7 and 8 is illustrated in the partial cross-section of an engine and automatic transmission in FIG. 9. In this view, engine 520 and transmission 522 include an associated selectively engageable counter-rotating inertia device 524 that may be implemented by a machine or a simple rotating mass as described with respect to other embodiments. The view of FIG. 9 includes a transport structure 530 that pivots about pin 532, which couples transport structure 530 to cylinder block structure 534 of engine 520, to selectively engage and disengage counter-rotating inertia provided by machine or mass 546. Device 546 is secured to shaft 536, which is supported for rotation in transport structure 530 by associated bearings 538, 540, and 542. A drive pulley 480 is mounted for rotation with shaft 536 and cooperates with an associated drive belt 482 to selectively drive device 524. Belt control clamp 490 is not shown in this view.

As also shown in FIG. 9, engine 520 includes a flex plate 564 secured for rotating with the crankshaft by bolts 566. Flex plate 564 includes an integral or unitary large diameter pulley 484 to engage belt 482 when device 524 is pivoted from the disengaged position (illustrated) to the engaged position using an associated clamping force 560. Flex plate 564 is coupled in a conventional manner to torque converter 570 of transmission 522 by studs 572.

In operation, device 524 is pivoted about pin 532 from the disengaged position (illustrated) to an engaged position by clamping force 560 so that axis 554 of shaft 536 is substantially parallel with crankshaft axis 574 and belt 482 contacts pulley 484. In the engaged position, rotation of flex plate 564 and large diameter pulley 484 drives belt 482 and drive pulley 480 to rotate in the opposite direction. Pulley 480 and inertial component 546 are mounted on a common shaft 536 to provide the counter-rotating inertia. When engine speed, operating mode, or other engine or ambient operating conditions dictate, clamping force 560 is removed allowing device 524 to pivot to the disengaged position as illustrated. As previously described, when implemented by a machine, device 524 may function as an integral starter/generator to provide engine cranking (replacing a conventional starter motor), vehicle launch assist, and/or regenerative braking.

In an alternative embodiment incorporating a direct drive arrangement for a selectively engageable counter-rotating inertia, a transport having a rubber treaded wheel mounted for rotation with an inertial component is movable from a disengaged position to an engaged position with the treaded wheel in contact with the large diameter pulley to frictionally drive the wheel and provide counter-rotation of the inertial component. In this type of drive arrangement, the belt and idler pulley(s) are eliminated.

As such, the present invention provides various systems and methods for managing inertial torque reaction using a selectively engageable counter-rotating inertia to reduce or eliminate the torque reaction on the powertrain structure and improve performance with respect to noise, vibration, and harshness (NVH). Selectively disengaging the counter-rotating inertia at higher engine rotational speeds reduces any adverse impact on system performance and response, reduces any associated friction and wear of the coupling device and counter-rotating inertia, and facilitates use of a positive speed differential to increase speed of the counter-rotating inertia relative to the crankshaft so that effective inertia can be substantially matched with smaller and less massive components.

While the best mode for carrying out the invention has been described in detail, those familiar with the art to which this invention relates will recognize various alternative designs and embodiments for practicing the invention as defined by the following claims.

What is claimed is:

1. A method for managing inertial torque reaction of a powertrain including an engine having a crankshaft, the method comprising:
   coupling and uncoupling at least one inertial component to the crankshaft to selectively rotate inertia in a direction opposite to the crankshaft.

2. The method of claim 1 wherein the step of coupling comprises coupling and uncoupling the at least one inertial component in response to current engine operating conditions.

3. The method of claim 2 wherein the step of coupling comprises uncoupling the at least one inertial component when engine speed exceeds a corresponding threshold.

4. The method of claim 1 wherein the step of coupling and uncoupling comprises coupling and uncoupling a machine.

5. The method of claim 4 wherein the step of coupling and uncoupling comprises operating the machine as a motor to substantially match rotational speed of a drive component and driven component of a coupling device associated with the electrical machine and the crankshaft before coupling the electrical machine to the crankshaft.

6. The method of claim 4 further comprising:
   coupling the machine to the crankshaft; and
   operating the machine as a motor to crank the engine.

7. The method of claim 4 further comprising:
   decoupling the machine from the crankshaft when engine speed exceeds an associated threshold; and
   operating the machine as a generator to provide regenerative braking for the at least one inertial component.

8. The method of claim 4 further comprising selectively coupling an electrical load to the machine to generate a variable torque that reduces torsional vibrations.

9. The method of claim 1 wherein the step of coupling and uncoupling comprises coupling the at least one inertial component using a coupling device that rotates the at least one inertial component faster than the crankshaft to substantially match effective rotational inertias of the at least one backward rotating inertial component and at least one forward rotating inertial component.

10. A system for managing inertial reaction torque in a vehicle powertrain, the system comprising:
   an internal combustion engine having a crankshaft that rotates during operation; and
   a coupling device for selectively coupling at least one inertial component to the crankshaft and rotating the inertial component in a direction opposite to crankshaft rotation.

11. The system of claim 10 wherein the coupling device comprises a clutch.

12. The system of claim 10 wherein the at least one inertial component comprises an electrical machine.

13. The system of claim 10 wherein the coupling device comprises:
   a first sprocket mounted for selective rotation with or about the crankshaft; a coupling pin movable between a disengaged position that allows the first sprocket to rotate about the crankshaft and an engaged position that couples the first sprocket to the crankshaft for rotation with the crankshaft;
   an intermediate shaft having a second sprocket and drive gear mounted for rotation therewith;
   a drive chain extending around the first and second sprockets; and
   a counter rotating shaft having a driven gear mounted for rotation therewith and in constant meshing engagement with the drive gear of the intermediate shaft.

14. The system of claim 13 further comprising an electrical machine coupled to the counter rotating shaft.

15. The system of claim 14 wherein the electrical machine is selectively operated as a motor to increase rotational speed of the counter rotating shaft prior to moving the coupling pin to the engaged position.

16. The system of claim 14 wherein the electrical machine is selectively operated as a generator to provide regenerative braking of the vehicle.

17. The system of claim 14 wherein the electrical machine is selectively operated as a motor when the coupling pin is moved to the engaged position to provide engine cranking and vehicle launch assist.

18. The system of claim 10 wherein the coupling device comprises:
a first pulley coupled to the crankshaft for rotation therewith; and
a transport having an associated drive pulley mounted for rotation with an inertial component, at least one idler pulley, and a belt disposed around the drive pulley and the at least one idler pulley, the transport movable to an engaged position with the belt in contact with the first pulley to frictionally drive the belt and provide counter-rotation of the inertial component.

19. The system of claim 18 further comprising a plurality of belt control clamps to secure the belt around the drive pulley and the at least one idler pulley when the transport is in the disengaged position.

20. The system of claim 10 wherein the coupling device comprises:
a large diameter pulley coupled to the crankshaft for rotation therewith; and
a transport having a rubber treaded wheel mounted for rotation with an inertial component, the transport movable to an engaged position with the wheel in contact with the large diameter pulley to frictionally drive the wheel and provide counter-rotation of the inertial component.

21. The system of claim 10 wherein the coupling device comprises:
a scissors gear mounted for selective rotation with the crankshaft; and
a drive gear mounted for rotation with an inertial component, the drive gear in constant meshing engagement with the scissors gear to reverse rotational direction of the inertial component relative to the scissors gear.

22. The system of claim 21 further comprising a clutch for selectively coupling the scissors gear for rotation with the crankshaft.

* * * * *